(12) United States Patent
Samaranayake

(10) Patent No.: US 12,240,941 B2
(45) Date of Patent: Mar. 4, 2025

(54) ROSIN-BASED POLYMER FOR STAIN-BLOCKING COATING COMPOSITIONS

(71) Applicant: SWIMC LLC, Cleveland, OH (US)

(72) Inventor: Gamini Samaranayake, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 18/653,363

(22) Filed: May 2, 2024

(65) Prior Publication Data

US 2024/0294702 A1    Sep. 5, 2024

Related U.S. Application Data

(63) Continuation of application No. PCT/US2022/049289, filed on Nov. 8, 2022.

(60) Provisional application No. 63/277,923, filed on Nov. 10, 2021.

(51) Int. Cl.
| C09D 167/08 | (2006.01) |
| C08G 59/42 | (2006.01) |
| C08L 67/08 | (2006.01) |
| C09D 5/00 | (2006.01) |
| C09D 5/02 | (2006.01) |
| C09D 7/65 | (2018.01) |
| C08G 59/18 | (2006.01) |

(52) U.S. Cl.
CPC ......... *C08G 59/4215* (2013.01); *C09D 5/002* (2013.01); *C09D 5/027* (2013.01); *C09D 7/65* (2018.01); *C08G 2150/00* (2013.01)

(58) Field of Classification Search
None
See application file for complete search history.

(56) References Cited

U.S. PATENT DOCUMENTS

| 3,006,936 | A | * | 10/1961 | Findley .................. C08G 65/22 |
| | | | | 528/366 |
| 3,044,890 | A | | 7/1962 | Joseph et al. |
| 3,287,206 | A | | 11/1966 | Aldrich et al. |
| 3,296,001 | A | | 1/1967 | Edwin et al. |
| 3,368,987 | A | | 2/1968 | Pollart et al. |
| 3,644,251 | A | | 2/1972 | Wilhelmi |
| 3,782,896 | A | | 1/1974 | Holzrichter et al. |
| 3,883,461 | A | | 5/1975 | Wagner |
| 3,906,142 | A | | 9/1975 | Dowthwaite et al. |
| 4,148,665 | A | | 4/1979 | Kulick et al. |
| 4,157,982 | A | | 6/1979 | Clemons et al. |
| 4,199,369 | A | | 4/1980 | Hughes et al. |
| 4,219,382 | A | | 8/1980 | Leffler |
| 4,263,182 | A | | 4/1981 | Aldrich |
| 4,309,338 | A | | 1/1982 | Okumichi et al. |
| 4,374,673 | A | | 2/1983 | Aldrich |
| 4,422,879 | A | | 12/1983 | Poppel et al. |
| 4,646,186 | A | | 2/1987 | Tsuchiya et al. |
| 4,654,388 | A | | 3/1987 | Lofgren |
| 4,927,496 | A | | 5/1990 | Walkden |
| 4,983,257 | A | | 1/1991 | Schultz et al. |
| 5,127,948 | A | | 7/1992 | Shepherd |
| 5,393,338 | A | | 2/1995 | Pudney et al. |
| 5,510,003 | A | | 4/1996 | Colasurdo et al. |
| 5,817,214 | A | | 10/1998 | Sasaki et al. |
| 5,846,308 | A | | 12/1998 | Lauzon |
| 6,042,691 | A | | 3/2000 | Nitzman et al. |
| 6,165,320 | A | | 12/2000 | Bates et al. |
| 6,306,938 | B1 | | 10/2001 | Mathers et al. |
| 6,315,824 | B1 | | 11/2001 | Lauzon |
| 6,609,459 | B1 | | 8/2003 | Figov |
| 6,927,014 | B1 | | 8/2005 | Figov |
| 7,923,495 | B2 | | 4/2011 | Yoshida |
| 9,133,317 | B2 | | 9/2015 | Asami et al. |
| 10,428,593 | B2 | | 10/2019 | Gard et al. |
| 10,450,478 | B1 | | 10/2019 | Lin et al. |
| 2007/0049671 | A1 | | 3/2007 | Finch et al. |
| 2012/0248366 | A1 | | 10/2012 | Ehrhardt |
| 2015/0087732 | A1 | * | 3/2015 | Liu .................. C08G 63/42 |
| | | | | 521/64 |
| 2020/0056055 | A1 | | 2/2020 | Niimoto et al. |
| 2021/0009747 | A1 | | 1/2021 | Aou et al. |

FOREIGN PATENT DOCUMENTS

| CA | 1026057 A | 2/1978 |
| CA | 1057467 A | 7/1979 |
| CA | 1068452 A | 12/1979 |
| CN | 109796875 A | 5/2019 |
| CN | 112175522 A | 1/2021 |

(Continued)

OTHER PUBLICATIONS

Tsujimoto T. et al. "Bio-based Polymeric Materials from Epoxidized Triglyceride and Rosin Derivatives", Research Article iMedPub Journals, vol. 2 No. 1:1, http://www.imedpub.com, Published Jan. 18, 2016, 7 pages.

Yang et al. "A fully bio-based epoxy vitrimer: Self-healing triple-shape memory and reprocessing triggered by dynamic covalent bond exchange" Materials and Design 186 (2020) 108248, 10 pages.

International Designation D7514-14. "Standard Test Method for Evaluating Ink Stainblocking of Architectural Paint Systems by Visual Assessment" Copyright © ASTM International Aug. 5, 2021, 4 pages.

(Continued)

*Primary Examiner* — Michael J Feely
(74) *Attorney, Agent, or Firm* — Honigman LLP

(57) ABSTRACT

A shellac-substitute is described herein in the form of an acid-functional polymer or an acid-functional polyester polymer. The acid-functional polyester polymer, among other uses, is suitable for stain-blocking with coating compositions, such as primers, sealants, stain-blocking coating compositions, odor-blocking compositions, and/or varnishes.

28 Claims, No Drawings

(56) References Cited

FOREIGN PATENT DOCUMENTS

| | | | |
|---|---|---|---|
| DE | 4012605 | A1 | 11/1991 |
| EP | 0150754 | A2 | 8/1985 |
| EP | 0292124 | A1 | 11/1988 |
| EP | 0293119 | A1 | 11/1988 |
| EP | 0508203 | A1 | 10/1992 |
| EP | 0587287 | A1 | 3/1994 |
| EP | 0652323 | A1 | 5/1995 |
| EP | 0686727 | A2 | 12/1995 |
| EP | 0894120 | A1 | 2/1999 |
| EP | 1023183 | A1 | 8/2000 |
| EP | 2090622 | A2 | 8/2009 |
| FR | 1458809 | A | 3/1966 |
| GB | 991504 | A | 5/1965 |
| GB | 998521 | A | 7/1965 |
| GB | 1003972 | A | 9/1965 |
| GB | 1043703 | A | 9/1966 |
| GB | 1063758 | A | 3/1967 |
| GB | 1100587 | A | 1/1968 |
| GB | 1258530 | A | 12/1971 |
| GB | 1266567 | A | 3/1972 |
| GB | 1297374 | A | 11/1972 |
| GB | 1324488 | A | 7/1973 |
| GB | 1442074 | A | 7/1976 |
| GB | 1483902 | A | 8/1977 |
| GB | 1547282 | A | 6/1979 |
| GB | 1593470 | A | 7/1981 |
| JP | 57167349 | A | 4/1981 |
| JP | 2908775 | B2 | 6/1999 |
| JP | 2001254291 | A | 9/2001 |
| JP | 3274760 | B2 | 4/2002 |
| JP | 3382006 | B2 | 3/2003 |
| JP | 4100049 | B2 | 6/2008 |
| JP | 4145383 | B2 | 9/2008 |
| WO | 99/16975 | A1 | 4/1999 |
| WO | 2011073164 | A1 | 6/2011 |
| WO | 2011097484 | A1 | 8/2011 |
| WO | 2019/122383 | A1 | 6/2019 |

OTHER PUBLICATIONS

Huang et al, "Bio-based thermosetting epoxy foams from epoxidized soybean oil and rosin with enhanced properties," Industrial Crops and Products, Nov. 1, 2019 (Nov. 1, 2019), vol. 139, pp. 1-9; p. 1, abstract, p. 2, left col., para 3-4, right col., para 1, p. 3, Fig. 1a-b.
A. Takahashi et al. "Biocomposites composted of epoxidized soybean oil cured with terpene-based acid anhydride and cellulose fibers," Journal of Applied Polymer Science, May 5, 2008, (May 5, 2008), vol. 108, pp. 1596-1602; p. 1596, abstract, p. 1597, Figure 1.
International Search Report and Written Opinion issued in International Application No. PCT/US2022/049289 mailed on Feb. 9, 2023, 8 pages.

* cited by examiner

ROSIN-BASED POLYMER FOR STAIN-BLOCKING COATING COMPOSITIONS

CROSS REFERENCE TO RELATED APPLICATION

This application is a Continuation of PCT/US2022/049289 filed on Nov. 8, 2022, which is a PCT application of and claims priority under 35 U.S.C. 119 to US Provisoinal Application No. 63/277,923 filed on November 10 2021. The entire contents of both aforementioned applications are incorporated herein by reference.

FIELD

This application generally relates to additive and coating compositions for stain-blocking and, in particular, rosin-based polymers, such as polyesters, for stain-blocking primer compositions

BACKGROUND

Coating compositions for primers, sealants, stain-blocking coatings, odor-blocking coatings, and/or varnishes typically include shellac as a functional component providing the sealing or blocking functionality. Shellac is a naturally-sourced component obtained as a resin from the lac bug as recovered from trees and other vegetation of certain countries. Raw shellac is processed into a resin component used in the coating compositions. However, the supply chain for this material is variable and inconsistent. Oftentimes, shellac is in short supply, has variable quality, requires extensive purification, and/or subject to price variation to suggest but a few shortcomings of using this raw material source. While the supply and quality of shellac can be problematic, its performance in coatings has previously been unmatched, and attempts to replace such material has been met with unacceptable performance.

SUMMARY

In one aspect, a shellac-substitute is described herein in the form of an acid-functional polymer or an acid-functional polyester polymer. The acid-functional polyester polymer, among other uses, is suitable for coating compositions, such as primers, sealants, stain-blocking coating compositions, odor-blocking compositions, and/or varnishes. In one approach, the acid-functional polyester polymer includes an acid-functional polyester polymer suitable for a stain-blocking coating composition wherein the acid-functional polyester polymer is obtained from reactants including (i) an epoxidized ester of glycerol and a $C_{10}$ to $C_{30}$ fatty acid, (ii) an acid-functional terpenoid compound, and (iii) an epoxidized ester of a $C_{10}$ to $C_{30}$ fatty acid.

In other aspects or approaches, the shellac-substitute of the previous paragraph may be combined with one or more optional features in any combination. These optional features may include one or more of the following: wherein the polyester polymer has a weight average molecular weight of about 1,000 to about 10,000; and/or wherein the polyester polymer has an acid value of about 50 to about 150 mg KOH per gram; and/or wherein the polyester polymer has a hydroxyl value of about 50 to about 300 mg KOH per gram; and/or wherein the polyester polymer has a glass transition temperature of about −5° C. to about 50° C.; and/or wherein the acid-functional terpenoid compound is a bicyclic to a tetracyclic compound; and/or wherein the acid-functional terpenoid compound is substituted with one or more $C_1$ to $C_{10}$ linear or branched alkyl groups; and/or wherein the acid-functional terpenoid compound has an acid functionality of 2 or more; and/or wherein at least a portion of the acid-functional groups of the polyester polymer are at least partially neutralized with a base to provide water dispersibility thereto; and/or wherein the base is a tertiary amine; and/or wherein the base is selected from the group consisting of dimethylethanolamine, triethanolamine, triethyl amine, dimethylaminomethylpropanol, and combinations thereof; and/or wherein the reactants are bio-sourced; and/or wherein the acid-functional polyester is obtained from (i) about 10 to about 30 weight percent of the epoxidized ester of glycerol and a $C_{10}$ to $C_{30}$ fatty acid, (ii) about 50 to about 70 weight percent of the acid-functional terpenoid compound, and (iii) about 10 to about 25 weight percent of the epoxidized ester of a $C_{10}$ to $C_{30}$ fatty acid; and/or wherein a coating composition including the acid-functional polyester polymer having a wet coating thickness of about 4 to about 7 mils, when dried as a film, exhibits stain-blocking as evidenced by a total ΔE of 2 or less.

In other aspects or approaches, the present application also provides for a stain-blocking coating composition including, in some embodiments, at least the acid-functional polyester polymer of the previous two paragraphs. In other aspects, the coating composition includes at least one mineral extender, one or more pigments, and a carrier solvent; and a stain-blocking additive including an acid-functional polyester polymer obtained from reactants including (i) an epoxidized ester of glycerol and a $C_{10}$ to $C_{30}$ fatty acid, (ii) an acid-functional terpenoid compound, and (iii) an epoxidized ester of a $C_{10}$ to $C_{30}$ fatty acid.

In yet further aspects or approaches, the coating composition of the previous paragraph may include optional features in any combination. These optional features may include one or more of the following: wherein the coating composition includes at least about 10 weight percent, preferably, at least about 12 weight percent, and more preferably, at least about 15 weight percent, based on total solids, of the stain-blocking additive; and/or wherein the coating composition includes about 30 weight percent or less, preferably about 25 weight percent or less, and more preferably, about 20 weight percent or less, based on total solids, of the stain-blocking additive; and/or further comprising a weight ratio of the stain-blocking additive to the at least one mineral extender of about 1:1 to about 1:3, preferably about 1:2 to about 1:3, and more preferably, about 1:2.5 to about 1:3; and/or wherein the stain-blocking additive is bio-sourced and/or the stain-blocking composition is substantially free of shellac-based additives; and/or wherein the stain-blocking additive is a polyester polymer of Formula 1 having a weight average molecular weight of about 1,000 to about 10,000

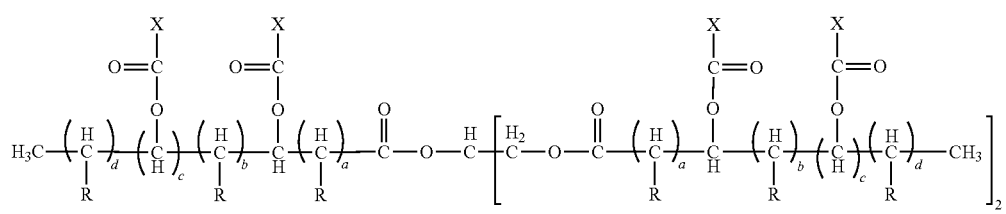

(Formula I)

wherein each R of Formula I is independently hydrogen or a hydroxyl group; each a is independently an integer of 1 to 10, each b is independently an integer of 1 to 10, each C is independently an integer from 0 to 10, and each d is independently an integer of 0 to 10 such that a+b+c+d is a value from 10 to 30 sufficient to provide the weight average molecular weight of the polymer; each X is an acid-functional terpenoid compound of Formula II

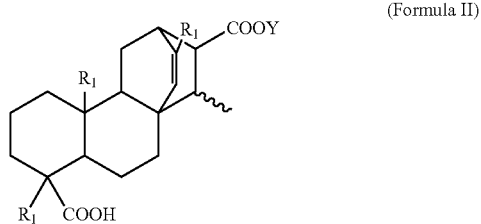

(Formula II)

Wherein each $R_1$ is independently a $C_1$ to $C_4$ linear or branched alkyl group; ∿∿∿ represents a covalent bond to the polymer of Formula I; and Y of Formula II is one of (i) a covalent bond to another polymer of Formula I or (ii) a residue of the epoxidized ester of a $C_{10}$ to $C_{30}$ fatty acid; and/or wherein polyester polymer includes about 10 to about 25 weight percent of the epoxidized ester of a $C_{10}$ to $C_{30}$ fatty acid; and/or wherein the epoxidized ester of a $C_{10}$ to $C_{30}$ fatty acid is an epoxidized methyl ester of a $C_{16}$ to $C_{20}$ fatty acid; and/or wherein the polyester polymer has an acid value of about 50 to about 150 mg KOH per gram, and/or wherein the polyester polymer has a hydroxyl value of about 50 to about 300 mg KOH per gram; and/or wherein the composition includes no greater than about 5 grams of total VOC per 100 grams of polymer solids; and/or wherein the composition is substantially free of VOCs, preferably, substantially completely free of VOCs, and more preferably, completely free of VOCs; and/or wherein at least a portion of acid-functional groups of the polyester polymer are neutralized with a base to provide water dispersibility thereto; and/or wherein the coating composition having a wet coating thickness of about 4 to about 7 mils, when dried as a film, exhibits stain-blocking as evidenced by a total ΔE of 2 or less; and/or wherein the reactants are bio-sourced.

In yet further aspects or approaches, the present application provides methods or use of any embodiment of the stain blocking additive or coating composition including the stain block additive of this Summary for blocking a stain. In approaches, stain blocking refers to use of a coating composition having a wet coating thickness of about 4 to about 7 mils, when dried as a film, exhibits stain-blocking as evidenced by a total ΔE of 2 or less; and/or wherein the reactants are bio-sourced.

DETAILED DESCRIPTION

The present disclosure provides a polymer or stain-blocking additive suitable as a shellac substitute in coating compositions for primers, sealants, stain-blocking coatings, odor-blocking coatings, and/or varnishes and to coating compositions including such polymers. In one approach, the polymer or stain-blocking additive is an acid-functional, terpenoid-based polymer, and preferably, an acid-functional, terpenoid-based polyester polymer obtained from reactants including (i) an acid-functional cyclic terpenoid compound, (ii) a multi-functional epoxidized ester of glycerol and a $C_{10}$ to $C_{30}$ fatty acid, and (iii) a mono-functional epoxidized fatty acid ester of a $C_{10}$ to $C_{30}$ fatty acid. As discussed more below, such a polymer can be obtained, in one approach, from wood rosin providing the cyclic terpenoid base, an epoxidized polyfunctional soybean oil, and an epodixidized monofunctional fatty acid reacted to form polyester polymers having bicyclic to tetracyclic terpenoid moieties and one or more of (i) a high acid value, (ii) a high hydroxyl number, and/or (iii) sufficient long chain fatty acid pendant groups providing a structure and functional properties equivalent to shellac. As such, the coating compositions including such polymers are preferably free off, significantly free of, substantially free of, substantially completely free of, or completely free of shellac-based ingredients as those terms are defined below.

Stain Blocking Additive/Polymer

The base reactant (i) of the stain-blocking polymers herein is an acid-functional cyclic terpenoid compound. In approaches, the acid-functional cyclic terpenoid compound is a bicyclic to tetracyclic acid-functional compound, preferably a tricyclic compound, that has an acid functionality of 2 or more, and in other approaches, 3 or more, and preferably, an acid functionality of 3. Suitable cyclic terpenoid compounds may be sourced from wood rosin or equivalent materials and be further functionalized to achieve the desired level of acid groups through reaction with short-chain diacids, anhydrides, and the like. The base terpenoid compound may have a structure of Formula I (Formula I)

wherein each $R_1$ of Formula I is, independently, a C1 to C10 (in other approaches, a C1 to C4) linear or branched alkyl group, and preferably two $R_1$ groups of Formula I are methyl groups and one $R_1$ group of Formula I is a branched $C_3$ group, such as the compound of Formula Ia below:

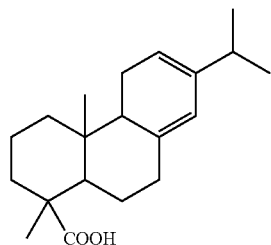

(Formula Ia)

To provide sufficient acid functionality, the base terpenoid compound of Formula I or Formula Ia may be further acid functionalized by reacting with a diacid or anhydride, such as maleic acid, fumaric acid, anhydride derivatives thereof, and/or combinations thereof to obtain the desired level of acid functionality or acid groups of the base resin component for the polymers herein. In approaches, the acid functionalized terpenoid compounds may have the structure of Formula II below having an acid functionality of 2 or more and, preferably, 3 or more, and preferably 3 as shown in the structure below:

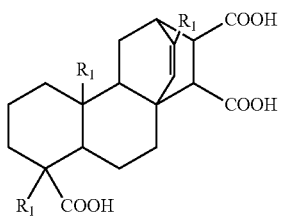

(Formula II)

with $R_1$ of Formula II as described above. In approaches, the compound of Formula II may be prepared by a Diels-Alder reaction or other suitable mechanism.

The acid functionalized terpenoid compound of Formulas I, Ia, and/or II is then polymerized with the multi-functional epoxide reactant (ii), such as an epoxidized ester of glycerol and a C10 to C30 fatty acid, and then capped with the monofunctional epoxide reactant (iii), such as monofunctional epoxidized esters of a C10 to C30 fatty acid, to the desired molecular weight. In some approaches, the resultant polymers herein are acid-functionalized polyester polymers having an weight average molecular weight of about 1,000 to about 10,000 and, in other approaches, about 2,000 to about 8,000, and in yet further approaches, about 4,000 to about 6,000. The polymer may also have an acid value of at least about 50 mg KOH per gram, at least about 60 mg KOH per gram, at least about 70 mg KOH per gram, or at least about 80 mg KOH per gram. The polymer, in other approaches, may also have an acid value of about 150 mg KOH per gram or less, about 120 mg KOH per gram or less, or about 100 mg KOH per gram or less. The polymer may also have a glass transition temperature of about −5° C. to about 50° C., in other approaches, about 0° C. to about 40° C., and in yet other approaches, about 10° C. to about 30° C. The polymer may further have a hydroxyl value of about 50 to about 300 mg KOH per gram, about 100 to about 300 mg KOH per gram, or about 150 to about 280 mg KOH per gram.

The acid functionalized terpenoid compound of Formula I, Ia, and/or II is polymerized with the multi-functional epoxide reactant (ii), which is preferably an epoxidized ester of glycerol and a C10 to C30 fatty acid. In one Example, the multi-functional epoxide reactant (ii) has the structure of Formula IVa or, in some embodiments, Formula IVb below:

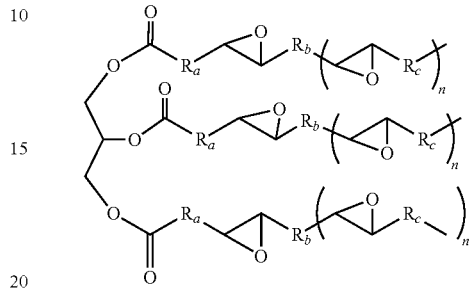

(Formula IVa)

wherein each R group of Formula IVa is a C1 to C10 hydrocarbyl group; each a, b, and c, of Formula IVa, independently, are integers of 0 or 10; and n of Formula IVa is an integer of 0 or 1 such that the multi-functional epoxide has up to 30 total carbons in each individual ester group and an average epoxide number of about 2 to about 4.

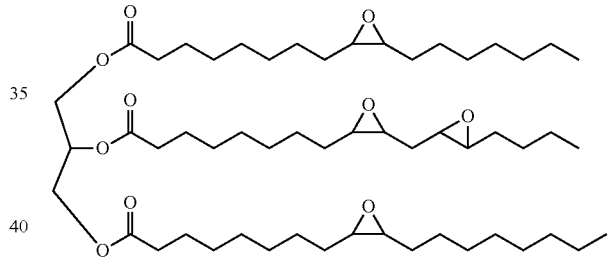

(Formula IVb)

In one approach, the multi-functional epoxide may preferably be obtained from soybean oil and have an average epoxide functionality of about 2 to about 5, in other approaches, about 4 to about 5, and in yet further approaches, about 4.3 to about 5. In this initial polymerization reaction, the carboxylic acids of the terpenoid compound will open at least a portion of the epoxide rings at elevated temperatures, such as about 130° C. or higher, and preferably about 130° C. to about 210° C. The reaction forms an ester and a hydroxyl group. In an approach, the reaction proceeds for a time sufficient to generate the desired molecular weight, acid number, and/or hydroxyl number of the polymer. A catalyst may be used with the polymerization and reaction time varies from about 2 hours to about 5 or more hours depending on catalyst selection. Suitable catalyst may be p-toluene sulfonic acid (PTSA), imidazole, methyl imidazole, trialkyl amines, diazabicyclo undecane, dimethyl aminopyridine, or combinations thereof.

In a second stage of the polymerization, the monofunctional epoxide reactant, such as the monofunctional epoxidized ester of a C10 to C30 fatty acid, is then then added to polymerization product to end-cap any excess secondary carboxylic acid groups, to terminate any chain growth to desired molecular weights, and/or both. In approaches, the mono-functional epoxide has the structure of Formula Va or, in some embodiments, Formula Vb:

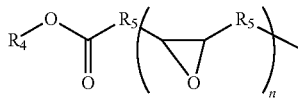
(Formula Va)

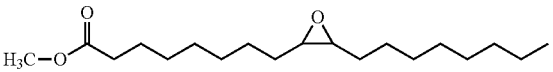
(Formula Vb)

wherein $R_4$ of Formula Va is a C1 to C4 alkyl group, preferably, a methyl group; each $R_5$ of Formula Va, independently, is a C1 to C20 hydrocarbyl group, and n of Formula Va is an integer from 0 to 4 such that the mono-functional epoxide has up to 30 total carbons in the ester moiety and an average epoxide number of about 1 to about 3, and preferably, about 1 to about 2.

In one approach, the mono-functional epoxidized ester is an soybean-based methyl ester. Preferably, this reactant controls the molecular weight of the formed polymer to the ranges as noted above. This end-capping reaction may proceed for 2 to 5 hours as needed to achieve the desired molecular weight, the acid number, and/or the hydroxyl number of the resultant polymer.

In embodiments, the resultant polymer may have the structure of Formula VI below. As shown, the polymer may have internal crosslinking via the acid-functional terpenoid groups.

(Formula VI)

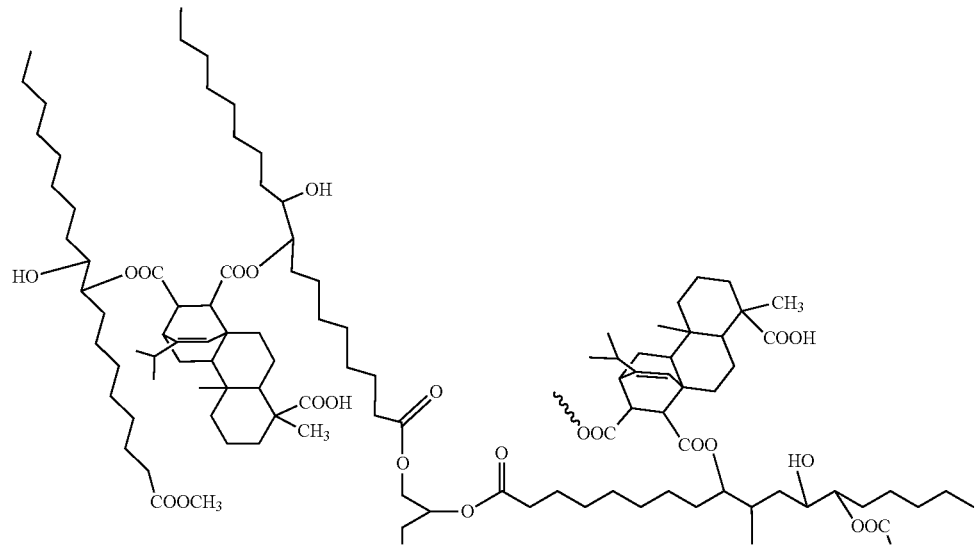

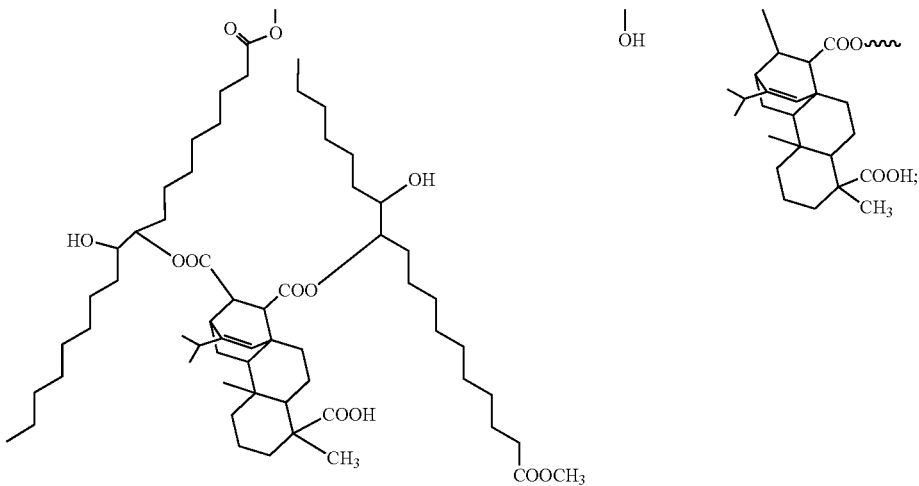

and in other forms, the resultant polymer of the disclosure herein may have the structure of Formula VII below

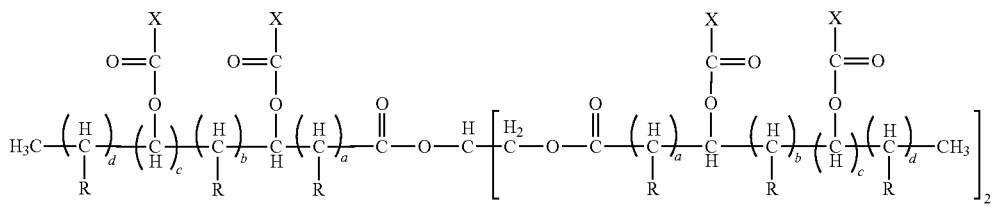

(Formula VII)

wherein each R of Formula VII is, independently, hydrogen or a hydroxyl group; each a of Formula VII is, independently, an integer of 1 to 10, each b of Formula VII is, independently, an integer of 1 to 10, each c of Formula VII is, independently, an integer from 0 to 10, and each d of Formula VII is, independently, an integer of 0 to 10 such that a+b+c+d is a value from 10 to 30 sufficient to provide the weight average molecular weight of the polymer; each X moiety of Formula VII is an acid-functional terpenoid compound or residue thereof of Formula VIIa below

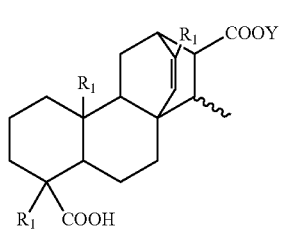

(Formula VIIa)

wherein each $R_1$ of Formula VIIa is independently a $C_1$ to $C_4$ linear or branched alkyl group; the symbol " ⌇⌇⌇ " of any formula herein represents a covalent bond to the polymer backbone of Formula VII; and Y of Formula VIIa is one of (i) a covalent bond to another polymer of Formula I or (ii) a residue of the epoxidized ester of a $C_{10}$ to $C_{30}$ fatty acid.

In approaches, the polymers herein, based on total resin solids have about 50 to about 70 weight percent of (i) the acid-functional terpenoid compound, in other approaches, about 55 to about 65 weight percent, and in yet further approaches, about 60 to about 62 weight percent of the acid-functional terpenoid compound; about 10 to about 30 weight percent of (ii) the epoxidized ester of glycerol and a $C_{10}$ to $C_{30}$ fatty acid, in other approaches, about 15 to about 30 weight percent, and in yet further approaches, about 16 to about 21 weight percent of the epoxidized ester of glycerol and a $C_{10}$ to $C_{30}$ fatty acid; and about 10 to about 25 weight percent of (iii) the monofunctional epoxidized ester of a $C_{10}$ to $C_{30}$ fatty acid, in other approaches, about 10 to about 25 weight percent, and in yet further approaches, about 15 to about 20 weight percent of the monofunctional epoxidized ester of a $C_{10}$ to $C_{30}$ fatty acid.

In some approaches, at least a portion of the acid-functional groups of the terpenoid compound or residue thereof on the stain-blocking additives/polymers herein may be neutralized or at least partially neutralized to provide water-dispersibility to the polymers. Neutralization may be through addition of a base before, during, or after polymerization. Suitable bases may be a tertiary amine, and in some approaches, the base may be selected from triethyl amine, dimethylethanolamine, triethanolamine, dimethylaminomethylpropanol, and the like amines, or combinations thereof. Neutralized compositions may include, on a solids basis, about 10 to about 40 weight percent of the amine, in other approaches, about 4 to about 15 weight percent of the amine, and in yet other approaches, about 4 to about 15 weight percent of the amine for neutralization. In this form, the polymers may be used in water borne compositions with low to no VOC content. As such, the coating compositions herein may be low to no VOC compositions and, in such context, low VOC or substantially free of VOCs means less than about 50 g/L, in other approaches, less than about 10 g/L, in yet other approaches, less than about 5 g/L, and in yet other approaches, no VOCs. In other approaches, the compositions herein are substantially free of VOCs, substantially completely free of VOCs, and completely free of VOCs as those terms are defined below.

In preferred approaches, the stain blocking additive/polymers herein may be a bio-based material that is bio-sourced or bio-derived and may include non-petrochemical-based materials. In other approaches, the bio-based materials may be sources from renewable processes and/or prepared from natural or renewable biological resources. For example, the terpenoid compound may be obtained or derived from wood rosin, the multi-functional fatty acid ester from soybean oil, and the mono-functional fatty acid ester from soy-based fatty acids.

Binder or Film Forming Polymers

The coating compositions disclosed herein may also optionally include at least one binder polymer or film-forming polymer in addition to shellac-substitute polymer or the stain-blocking additive/polymer as described above. In embodiments or approaches, the at least one binder may be any film forming polymer and, in approaches, may be any acrylic polymer or copolymers prepared from ethylenically unsaturated or vinyl monomers such as one or more of alkyl (meth)acrylate monomer units, vinyl acetate monomer units, styrene monomer units, ketone-functional vinyl monomer units, and the like, or combinations thereof. In some approaches, the binder polymer may have a glass transition temperature of about 0° C. to about 100° C. (in other approaches, about 10° C. to about 90° C., about 20° C. to about 80° C., about 20° C. to about 70° C., about 20° C. to about 30° C., about 10° C. to about 30° C., about 10° C. to about 20° C., or about 10° C. to about 15° C.)

In other approaches, the binder polymer may be an acrylic, styrene acrylic, or vinyl acrylic polymer or copolymer and/or blends thereof including ethylenically unsaturated monomers with at least carboxylic acid, alkyl acrylate, alkyl methacrylate, or acetate moieties. The polymer or copolymer may include as polymerizable units in a polymer backbone vinyl monomers and acrylic monomers such as at least vinyl acetate, alkyl acrylate, alkyl methacrylate, acrylic, styrene acrylic, and combinations thereof. Alkyl groups of the monomers may have chain lengths from C1 to C8 and, in some approaches, are ethyl, propyl, isopropyl, butyl, ethyl hexyl, and the like side groups.

In some approaches, vinyl monomers are selected from the group consisting of vinyl esters, vinyl aromatic hydrocarbons, vinyl aliphatic hydrocarbons, vinyl alkyl ethers and mixtures thereof. Examples of vinyl esters that may be used include vinyl acetate, vinyl propionate, vinyl laurate, vinyl pivalate, vinyl nonanoate, vinyl decanoate, vinyl neodecanoate, vinyl butyrates, vinyl benzoates, and vinyl isopropyl acetates. Examples of vinyl aromatic hydrocarbons that may be used include styrene, methyl styrenes and other lower alkyl styrenes, chlorostyrene, vinyl toluene, vinyl naphthalene and divinyl benzene. Examples of vinyl aliphatic hydrocarbons that may be used include vinyl chloride and vinylidene chloride as well as alpha olefins such as ethylene, propylene, isobutylene, as well as conjugated dienes such as 1,3 butadiene, methyl-2-butadiene, 1,3-piperylene, 2,3-dimethyl butadiene, isoprene, cyclohexene, cyclopentadiene, and dicyclopentadiene. Examples of vinyl alkyl ethers that may be used include methyl vinyl ether, isopropyl vinyl ether, n-butyl vinyl ether, and isobutyl vinyl ether.

Acrylic monomers suitable for use in the present compositions may include any compounds having acrylic functionality. Suitable acrylic monomers are selected from the group consisting of alkyl (meth)acrylates, acrylic acids, as well as aromatic derivatives of (meth)acrylic acid, acrylamides, acrylonitrile, or combinations thereof. Typically, the alkyl (meth)acrylate monomers (also referred to herein as "alkyl esters of (meth)acrylic acid") will have an alkyl ester portion containing from 1 to 12, in some approaches, about 1 to 8, in yet other approaches, about 1 to 6, and in yet further approaches, 1 to 4, carbon atoms per molecule.

Suitable acrylic monomers in the primary binder include, for example, methyl (meth)acrylate, ethyl (meth)acrylate, butyl (meth)acrylate, propyl (meth)acrylate, 2-ethyl hexyl (meth)acrylate, cyclohexyl (meth)acrylate, decyl (meth) acrylate, isodecyl (meth)acrylate, benzyl (meth)acrylate, isobornyl (meth)acrylate, neopentyl (meth)acrylate, 1-adamatyl methacrylate and various reaction products such as butyl, phenyl, and cresyl glycidyl ethers reacted with (meth) acrylic acid, hydroxyl alkyl (meth)acrylates, such as hydroxyethyl and hydroxypropyl (meth)acrylates, amino (meth)acrylates, as well as acrylic acids such as (meth) acrylic acid, ethacrylic acid, alpha-chloroacrylic acid, alpha-cycanoacrylic acid, crotonic acid, beta-acryloxy propionic acid, and beta-styryl acrylic acid.

In some approaches, the acrylic polymer of the at least one binder may include substantial amounts of a vinyl acetate monomer. The acrylic copolymer may also include about 90 to about 100 weight percent of linear or branched alkyl acrylate or alkyl methacrylate monomer, and in other approaches, about 94 to about 100 weight percent of a linear or branched alkyl acrylate or alkyl methacrylate monomer. In some approaches, the copolymer may further include substantial amounts of acrylic acid monomer.

The at least one binder polymer may also include optional ketone-functional vinyl monomer units. In some approaches, these monomer units may be derived from diacetone acrylamide, diacetone (meth)acrylamide, acetoacetoxyethyl (meth)acrylate, acrolein, methacrolein, vinylacetoacetate, crotonaldehyde, 4-vinylbenzaldehyde, vinyl alkyl ketones, acrylamidopivalaldehyde, methacrylamidopivalaldehyde, 3-acryl amidomethyl-anisaldehyde, diacetone acrylate, acetonyl acrylate, diacetone methacrylate, acetoacetoxyethylmethacrylate, 2-hydroxypropylacrylate acetylacetate, and butanediolacrylate acetylacetate and the like, and combinations thereof.

In some approaches, the at least one binder polymer may include about 0 to about 20 weight percent of the optional ketone-functional monomer units, and in other approaches, about 0 to about 12 weight percent, and in yet other approaches, about 1 to about 16 weight percent or 2 to about 12 weight percent as a percentage of the acrylic phase.

The at least one binder polymer may also include other optional monomers polymerized into the polymer backbone as needed for a particular application. For instance, the copolymer may further include ureido monomers, amino monomers, sulfonate monomers or surfactants, silane monomers, phosphate monomers or surfactants, carboxyl monomers or surfactants, and combinations thereof. In some approaches, the copolymer may further include vinyl monomers such as allyl imidazolidinone, allyl acetoacetates, allyl epoxies, epoxy acrylates, carbonyl monomers, other sulfonates, other phosphonates, vinyl phosphonate, allyl hydroxypopyl sodium sulfonate, allyloxy hydroxypropyl sodium sulfonate, and combinations thereof as needed for a particular application. In some approaches, for instance, the other monomers may each be present in the acrylic copolymer in amounts up to about 10 weight percent, and in other approaches, about 0.1 to about 5 weight percent, in other approaches, about 0.5 to about 2 weight percent, but the amounts may vary depending on the particular application. In other approaches, the other or additional monomers may each be included in the polymer backbone in amounts less than about 1 weight percent.

Extender Pigments

The coating compositions herein may also include optional inorganic or mineral extender particles or matting agents such as, but not limited to, aluminum silicate, magnesium silicate, calcium carbonate, silicates, diatomaceous earth, clay, asbestine, barytes, silica, mica, talc, various microspheres (glass, ceramic, or polymeric, and can be filled or hollow), or combinations thereof. If included, the compositions herein may have about 60 weight percent or less, about 40 weight percent or less, about 35 weight percent or less, or in other approaches, less than about 25 weight percent, in other approaches, less than about 20 weight percent, and in yet other approaches, none inorganic matting agents or extenders. In further approaches and if included, the compositions herein may include at least about 5 weight percent, at least about 15 weight percent, or even at least about 25 weight percent of the extender pigments. In other approaches and if used, the coating compositions herein may include about 25 to about 60 weight percent, preferably about 25 to about 40 weight percent, and more preferably, about 25 to about 35 weight percent mineral extenders.

Such mineral extenders or matting agents have particle sizes of about 0.1 micron or larger, or in other instances, about 1 micron or larger. In some approaches, the mineral extender may have a small particle size of from about 0.1 microns to about 1 microns. In yet other approaches, the mineral extender may have a larger particle size up to about 50 microns, such as about 5 to about 50 microns or about 10 to about 15 microns.

Surfactants

Surfactants or surface-active agents can optionally be used in the coating compositions of the present disclosure. Suitable surfactants for coating compositions are well known to those of ordinary skill in the paint and/or coating formulation art. In approaches, suitable surfactants may include nonionic surfactants such as, but not limited to, nonylphenol ethoxylates, octylphenol ethoxylates, polyether polyols, alkyl aryl polyether alcohols, ethylene oxide condensates of propylene oxide, propylene glycol adducts, or acetylenic alcohols. In other approaches, suitable surfactants may also include anionic surfactants such as, but not limited to, sodium lauryl sulfate, sodium dodecyl sulfate, sodium tridecylether sulfate, or diester sulfosuccinates and sodium salts of alkyl aryl polyether sulfonates. The surfactant, if present, is preferably about 0.2 weight percent to about 5 weight percent of the coating composition, in other approaches, about 0.2 weight percent to about 2 weight percent.

Carrier Solvent

The coating compositions herein may include a solvent or a carrier solvent, which may be an organic solvent, a low VOC solvent, a no-VOC solvent, and/or water for a water-based coating composition. Suitable organic solvents may include, but not be limited to, ethanol, propylene glycols, ethylene glycols, ethers and acetates thereof, alcohols, ketones, aliphatic and aromatic hydrocarbons and naphthas, petroleum and wood distillates, turpentine, pine oil, and the like. In one approach, the carrier solvent is ethanol. In other approaches, the carrier solvent is water. In some embodiments, solvent selection is limited primarily by the desire to maintain the overall VOC level of the coating composition below 305 g/l, preferably below 250 g/l. The coating compositions herein may have about 10 to about 30 weight percent of the solvent, in other approaches, about 15 to about 25 weight percent of the solvent.

Pigments

The coating compositions of the present disclosure may also include optional opacifying pigments. If included, suitable pigment particles or inorganic particles used in the polymer compositions or complexes or the water-borne paint composition of the present disclosure may be titanium dioxide ($TiO_2$), zinc oxide ($ZnO_2$), calcium carbonate ($CaCO_3$), talc, clay materials, aluminum oxide, silicon dioxide, magnesium oxide, zinc sulfate, combinations thereof, or other known pigment or inorganic particles suitable for paints and other coatings. In some approaches, the pigment or inorganic particle is titanium dioxide, which may comprise anatase titanium dioxide or rutile titanium dioxide, or a mixture of the two. In other approaches, the pigment or inorganic particle comprises rutile titanium dioxide, to the exclusion of anatase titanium dioxide. In some approaches, the rutile titanium dioxide is surface treated with an inorganic oxide, such as silica ($SiO_2$). Generally, the opacifying pigments, such as titanium dioxide, have a particle size less than a micron, such as about 0.2 to about 0.3 microns in diameter and provided in powder form, or in an aqueous slurry. An example of a titanium dioxide that is suitable for use is Ti-Pure® R-706, which is commercially available from E.I. du Pont de Nemours and Company. Ti-Pure® R-706 titanium dioxide is a rutile titanium dioxide that is surface treated with silica. In some approaches, the coating compositions herein may include about 10 to about 30 weight percent of titanium dioxide, about 15 to about 20 weight percent, or about 18 to about 25 weight percent of titanium dioxide.

Optional Additives

The coating compositions of the present disclosure may also include other optional additives as needed for typical applications. For instance, the coating composition of the present disclosure is produced using techniques known to those skilled in the art of manufacturing paint. In addition to the stain-blocking additive, the at least one binder polymer, the optional opacifying pigments, the coating composition may contain conventional additives such as thickeners, coalescing aids, surfactants, biocides, anti-foaming agents, freeze-thaw additives, and the like. It should also be appreciated that in addition to the opacifying pigment, small amounts of other pigments or colorants may be used to provide desired coloration or to confer other optical effects.

Stain-Blocking Coating Compositions

The coating compositions herein with stain-blocking functionality, in some approaches, may have effective amounts of the stain-blocking additive polymer to achieve desired stain block and described below. In approaches, the coating compositions may include about 25 to about 60 percent of the stain-blocking additive/polymer, in other approaches, about 40 to about 50 weight percent of the stain blocking additive/polymer, and in yet further approaches, about 25 to about 35 weight percent of the stain blocking additive/polymer (in approaches, the strain blocking additive/polymer is 40 weight percent solids in a carrier solvent compatible with the carrier solvent of the composition, such as an ethanol solution). The compositions may also including about 0 to about 5 weight percent of the at least one binder polymer, in other approaches, about 0.2 to about 5 weight percent, in other approaches, about 3 to about 4 weight percent of the at least one binder polymer, and in yet further approaches, about 3 to about 4 weight percent of the at least one binder polymer. The coating compositions may also include mineral extenders, carrier solvents, surfactants, and/or pigments as needed for suitable application. In approaches, the coating composition may also include the compositions of the table below.

|  | Conventional, wt % | Preferred, wt % |
| --- | --- | --- |
| Stain blocking additive* | 25-60 | 25-35 |
| Mineral extenders | 25-60 | 25-35 |
| Ethanol | 10-30 | 15-25 |
| Surfactant | 0.2-2 | 0.2-1.5 |
| Pigment ($TiO_2$) | 10-30 | 15-22 |

*40% solids in solvent (e.g. ethanol)

Glossary of Terms

Additives refer to a general category of components or other raw materials that may be added to the coatings herein to promote various properties. Examples include, but are not limited to, surfactants, defoamers, biocides, mildewcides, algaecides, thickeners, anti-settling agents, pH buffers, corrosion inhibitors, driers, and/or anti-skinning agents.

If used herein, Volatile Organic Compound or VOC generally refers to organic compounds that have a high vapor pressure at room temperature. In many cases, VOCs are compounds with a vapor pressure of greater than about 0.1 mm of Hg. VOC as reported herein is measured according to ASTM D2369-90 and is the weight of the VOC per volume of the coating solids in grams/L. As used herein, low VOC or substantially free of VOCs means less than about 50 g/L, in other approaches, less than about 10 g/L, in yet other approaches, less than about 5 g/L, and in yet other approaches, no VOCs As used herein, without the need for, without substantial levels of, in the absence of, or substantially free of, or free-of generally means (unless apparent from the context of the discussion) the coating compositions herein have less than about 1 weight percent, in other approaches, less than about 0.5 weight percent, in other approaches, less than about 0.2 weight percent, and in yet other approaches, none of the particular component or additive. In addition, (unless apparent from the context of the discussion), significantly free with respect to an ingredient means about 0.5 weight percent or less, substantially free with respect to an ingredient means about 0.2 weight percent or less, substantially completely free of an ingredient means about 0.1 weight percent or less, and completely free of an ingredient means none of such ingredient or at least no functional amount of such ingredient.

When referring to a polymer, oligomer, or copolymer, and a particular monomer or reactant is described, it is also intended that such discussion refers to the resulting monomer unit or associated repeating unit when polymerized within the polymer, oligomer, or copolymer. Likewise, when a monomer unit or repeating unit of a polymer, oligomer, or copolymer is described, the corresponding monomer or reactant is also contemplated by this disclosure. As used herein, the terms polymer or copolymer are interchangeable unless the context of discussion suggests otherwise. A polymer or copolymer herein typically have a weight average molecular weight of about 1,000 to about 40,000 and an oligomer typically has a molecular weight below 1000. As used herein, unless the context suggests otherwise, the term "polymer" includes both homopolymers (repeating units are derived from the same monomer) and copolymers (i.e., polymers of two or more different monomers). Similarly, "oligomer" includes both homo-oligomers and co-oligomers.

As used herein, (meth)acrylate monomer(s) or monomer unit(s) include both acrylate monomer(s) and monomer unit(s) and methacrylate monomer(s) and monomer unit(s) as well as functionalized (meth)acrylate monomer(s) or monomer unit(s) suitable for incorporation into the functionalized polymers or oligomers disclosed herein. Functional moieties may also bear other crosslinking groups, photo-reactive groups, anti-fouling agents, light absorbers, anti-corrosion agents, and the like as needed for a particular application or use.

As used herein, functionalized, functionality, or functional group means a group or moiety of a larger molecule or polymer reactive with another group or atom.

Opacity or hiding (in some approaches) generally refers to the ability of a film to scatter light based on the thickness of the film. The Opacity is often expressed as S/mil and may be in the form of Kubelka-Munk scattering coefficients as determined using a modification of ASTM D 2805-70 as described in J. E. Mchutt and H. L. Ramsay in American Paint and Coatings Journal, April, 1988, p. 46 by the weight drawdown method, which is incorporated herein by reference.

Sheen may also sometimes be referred to as gloss. In a coating, a gloss finish indicates that the surface which has a coating applied to it (i.e., is finished) it is shiny or glass-like. The gloss of a surface is described as the reflection of light from the surface that is independent of color. ASTM D523 may be used to measure sheen. The prescribed angle at which light is reflected off the surface may vary, but for the purposes of this disclosure to measure 85 Sheen, is measured at 85° relative to the surface reflecting the light. ASTM D523 may also be used to describe 60 Gloss, which is measured at 60° relative to the surface reflecting the light. Gloss may also refer to the gloss intensity measured at 20, 60, or 85 degrees and is determined according to ASTM D323. One of skill in the art is able to determine relative levels of gloss (low versus high) in context of each coating.

Paint or coating refers to any mixture or composition including different types of raw materials, each with its own function, which generally is balanced to achieve the desired properties in the final product or film coating. The two functions of paint or coating are decoration and/or protection. A paint or coating may contain a solvent (which can include a volatile component derived from a petroleum distillate for a solvent-based paint, or a low VOC, or no-VOC, or water for a water-based paint or composition), a binder polymer, a pigment, fillers (such as an extender or a plurality of extenders of different sizes) and an additive, which may impart different functionality to the paint or final coating.

Coatings refer to compositions such as paint, stains, lacquers, etc.

Pigment volume concentration or PVC refers to a number that represents the volume of pigment compared to the volume of all solids. In the field of paints and coatings, PVC is a useful measure because the binder (non-pigment) acts as the material to unite all the pigment and other raw materials into the paint and the PVC value ensures there is enough binder to enable the paint to adhere properly to whatever it has been applied over in addition to containing all of the other components of the paint. If a paint has no pigment at all it will usually be very glossy and have a PVC of zero. An example is clear gloss paints. Flat paints commonly have a very high pigment loading and have high PVCs (usually in the range from about 55% up to about 80%). Another non-limiting exemplary range of PVC in which pigment can be loaded is from about 60% to about 75%. Primers and undercoats vary from 30% to about 50% PVC as do semi-gloss, satin, and low sheen paints. Additionally, it is thought that the lower the PVC of a paint is, the better its mechanical properties (such as tensile strength, and consequently, exterior durability) will be. PVC may be expressed as a percentage. For example, if a coating has a PVC of 30, then 30% of the total binder/pigment blend is pigment, and 70% is binder solids on a volume basis.

Critical pigment volume concentration or CPVC is the point at which there is just enough binder to wet (entirely surround) the pigment particles. As PVC reaches and then increases above CPVC, mechanical properties of the paint deteriorate. Above CPVC, with insufficient binder to satisfy pigment surface and fill interstitial spaces, air is introduced into the film resulting in a decrease in film integrity. However, above CPVC, increased air and pigment interface results in a substantial boost in pigment scattering efficiency. A film below the CPVC has excess resin and may exhibit a smooth surface that reflects light or appears to be glossy. As the PVC of a film approaches CPVC, the film will appear to be flatter, although the aforementioned loss of mechanical properties may become a limiting factor in how close to CPVC a paint producer wishes to provide the PVC.

Burnish refers to the ability of a coating to retain its gloss value after being subjected to mechanical forces, such as abrasion. Burnish may be measured through ASTM D6736-08.

Refractive Index refers to a measurement that describes how light propagates through a material or medium. If needed, refractive index may be measured through one or more of ASTM D1218, D1747, or D542.

Contrast Ratio is calculated as $Y_{black}/Y_{white}$ and is the ratio of the reflectance of a film on a black substrate to that of an identical film on a white substrate. ASTM D2805-11 provides for the measurement of contrast ratio. $Y_{black}$ represents the reflectance value of a coating and measures the ability of a coating to cover against a black background. $Y_{white}$ represents the reflectance value of a coating and measures the ability of a coating to reflect light against a white background.

Scrub or scrub resistance refers to the ability of the surface of a coating film or paint film to resist being worn away or to maintain its original appearance when rubbed with or against an abrasive surface, typically during cleaning. Scrub resistance can be evaluated through ASTM D2486-96 (Standard Test Method for Scrub Resistance of Wall Paints).

Washability refers to the relative ease of removing dirt, soil, discolorations, and the like, from a dried film applied to a substrate surface, typically an interior architectural surface such as a wall, for example. The soil or dirt is typically removed by washing with abrasive and/or non-abrasive cleaning compositions. To measure washability, a standard test method, ASTM D3450-00 (Standard Test Method for Washability Properties of Interior Architectural Coatings) is used. The terms washability and stain resistance are used interchangeably herein.

Chemical resistance as measured herein is determined through ASTM D1308-02 (2013) relating to the chemical resistance of finishes. Chemical resistance tests performed herein were accomplished by following ASTM D1308-02 (2013) and reporting a rating for each substance tested on a scale of 1 to 5. The following six substances were used for each coating tested: Organic solvents—(1) ethanol, (2) Brake fluid, (3) methyl ethyl ketone ("MEK"); Base—(4) 25% aqueous sodium hydroxide (NaOH); Acids—(5) 10% aqueous acetic acid, and (6) 30% aqueous hydrochloric acid (HCl). The following rating scale was used to assign a rating 1 to 5 based on appearance of a coating applied to a substrate after exposure to a particular chemical, 1 indicating the worst performance and 5 the best: 1—substrate visible, 2—severe color change, rust, blistering, delamination, very soft, 3—slight to moderate blistering, delamination and/or wrinkling, loss of gloss, color change, or slightly soft, 4—very slight change in color and gloss at close inspection but seemingly no change at arm's length, 5—no apparent change in color and gloss, no change in film appearance at close inspection. A coating was ascribed a "good" chemical resistance rating where the sum of the test scores totaled 25 to 30.

Number average molecular weight (Mn) is reported in Daltons (Da), and can be determined, for example, using gel permeation chromatography (GPC) and a polystyrene standard being used for calibration.

Glass transition temperature (Tg) may be determined by differential scanning calorimetry (DSC) using a TA Instruments Q200 differential scanning calorimeter or the like instrument. Samples for differential scanning calorimetry ("DSC") testing are prepared by the following method. A sample is prepared by first removing volatile materials if necessary. To remove volatile materials, the polymer or composition is applied onto aluminum sheet panels, the panels are then baked in a laboratory electric oven for 20 minutes at 300° F. (149° C.), and the sample is allowed to cool to room temperature and the sample is scraped from the panels. To perform DSC, a sample for DSC is weighed into standard sample pans, and analyzed using a standard DSC heat-cool-heat method. Samples are equilibrated at -60° C., then heated at 20° C. per minute to 200° C., cooled to -60° C., and then heated again at 20° C. per minute to 200° C. Glass transition temperatures are calculated from the thermogram of the last heat cycle. The glass transition is measured at the inflection point of the transition.

The hydroxyl value (HN) of a resin may be measured by dissolving a suitable quantity of the resin in Methylene Chloride before mixing the sample for 15-20 minutes with a 4-(dimethylamino) pyridine (DMAP) catalyst solution and a 97% acetic anhydride solution in anhydrous dimethyl formamide (DMF). A solution of DMF and deionized water is then added and the solution is mixed for an additional 15-20 minutes. After supplemental addition of tetrahydrofuran (THF), a titration method with 0.5 N methanolic KOH and a phenolphthalein indicator is used to measure the hydroxyl value of a resin. Based on the amount of KOH consumed as compared to titration of a solution without the resin, the hydroxyl value is calculated and reported as mg KOH per 1 g dry resin.

The acid number (AN) of a resin may be measured by dissolving a suitable quantity of the resin in a solution of dimethyl formamide (DMF) and methyl ethyl ketone (MEK), then titrating with 0.1 N methanolic KOH and a cresol red/thymol blue indicator blend. Based on the amount of KOH consumed, the acid number is calculated and reported as mg KOH per 1 gram of dry resin.

Stain-blocking is measured pursuant to ASTM D7514-14 modified as follows: the basecoast paint (e.g., Promar 200 0 VOC (Sherwin Williams)) is spray applied at about 6 mil thickness and allowed to cure for about 48 hours; the stains are dried overnight; the test coating or primer coat is then applied using the 7 mil side of a Dowcaster film applicator and dried overnight; and the topcoat (e.g., Promar 200 VOC EW ES (Sherwin Williams)) is applied using the 5 mil side of a square applicator and dried overnight. Color measurements are then made using a X-Rite 964 or equivalent colorimeter or spectrophotometer and evidence of stain blocking is measured through a $\Delta E$ value using the colorimeter. $\Delta E$ is measured by the spectrophotoneter by comparing the paint that is exposed to the stain or otherwise stained to the paint that is clean or otherwise free of the stain. The difference is expressed as $\Delta E$. The difference in $\Delta E$'s fron the "control" paint and the "experimental" paint can then be calculated. The improvement in stain-blocking can be expressed as a percentage by taking the difference in $\Delta E$ divided by the $\Delta E$ of the "control" paint. As used herein, the compositions exhibit a $\Delta E$ stain blocking of 3 or less, 2 or less, 1.5 or less, or in some instances, 1 or less. A lower $\Delta E$ number is preferred. Specifically, measurements of $\Delta E$ compare the basecoat/primer/topcoat without the stain to the basecoat/stain/primer/topcoat are then made using the colorimeter and reported as $\Delta E$ using the colorimeter.

Certain terminology is used herein for convenience only and is not to be taken as a limitation on the present disclosure.

EXAMPLES

The following examples demonstrate the preparation of polymers and compositions such as those described hereinabove, as well as non-inventive examples for comparison. The examples are intended to be representative of the polymers and compositions herein that can be made and are not intended to limit the scope of the present disclosure to the specific illustrative examples disclosed below. All percentages, ratios, and amounts in this disclosure and the Examples are by weight unless the context of discussion herein suggests otherwise.

Example 1

An acid-functional polyester polymer is prepared as followed: a fumarated rosin having structure A below, an acid functionality of 3, and a number average molecular weight of about 418 was charged into a reactor and heated to about 80° C. and then the temperature was raised slowly to about 130° C. When the rosin was melted, triphenyl phosphite (TPP) and then a multifunctional epoxide from soybean oil and having an average epoxide functionality of 4 (Vikoflex 7170) was added, followed by a catalyst (p-toluene sulfonic acid (PTSA), imidazole (IM), or methyl imidazole (MIM)) as given in Table 1 below. The batch was maintained at about 130° C. for 1 hour and then the mono functional epoxide 2B from soybean fatty having an average epoxide functionality of about 1.26 (Vikoflex 7010) was then added and further reacted for another 2 to 5 hours as needed to reach an acid value of about 100 as shown in the table. The amounts of each monomer component and various properties of the resultant polymer are father set forth below in Table 1. The polymers of Table 1 can be compared to a prior shellac-based additive that had a Mn of 1129, a Mw of 3173, an acid value of 70, a calculated hydroxyl value of 260, and a Tg of 43.76° C.

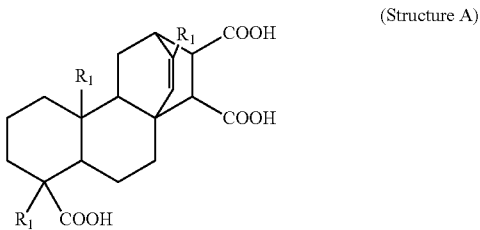

(Structure A)

TABLE 1

Acid Functional Shellac-Substitute Polymers

| | Rosin Acid (%) | Multifunctional Soybean oil (%) | Catalyst | Monofunctional Soybean fatty acid (%) | Mn | Mw | Acid Value | Hydroxyl # (Calc) | Tg (° C.) | Pencil Hardness | Spatula Scratch |
|---|---|---|---|---|---|---|---|---|---|---|---|
| A | 63.3 | 15.6 | PTSA | 21.0 | 609 | 2440 | 101 | 104 | −3.98 | 5B | soft |
| B | 63.8 | 15.7 | PTSA | 20.3 | 577 | 2130 | 120 | 80 | 4.5 | 5B | firm |
| C | 61.9 | 22.5 | PTSA | 15.6 | 692 | 6241 | 99 | 86 | 9.7 | 5B | firm |
| D | 60.8 | 19.5 | PTSA | 19.6 | 642 | 2868 | 118 | 88 | −3.9 | <6B | soft |
| E | 64.8 | 16.5 | PTSA | 18.6 | 589 | 2891 | 141 | 91 | 10.6 | 5B | firm |
| F | 58.8 | 21.4 | PTSA | 18.5 | 592 | 3416 | 110 | 90 | 4.73 | 5B | firm |
| G | 61.9 | 22.5 | IM | 15.6 | 647 | 4367 | 101 | | 13.3 | NT | firm |
| H | 61.9 | 22.5 | MIM | 15.6 | 649 | 4954 | 99 | | 13..8 | NT | firm |

Example 2

The polymers of Example 1 were then added to ethanol-based primer compositions and evaluated for stain blocking. Polymers A, B, C, and E from Example 1 were further evaluated. First, a 40 weight percent solution of the Example 1 polymer (either A, B, C, or E) was prepared in ethanol and then conventional primer compositions thereof were prepared including 30% of the polymer solution of Example 1, mineral extenders, ethanol, surfactant, and titanium dioxide pigment. A control primer including shellac was compared to the inventive samples. Each of the inventive samples and the control included the same composition of mineral extenders, ethanol, surfactant, and titanium dioxide. The only difference between the control and inventive samples was the stain blocking additive being either shellac or polymers A, B, C, or E (40% solution in ethanol for each).

Stain blocking was then evaluated of the control and the four inventive samples pursuant to the modified version of ASTM D7514-14 described above and ΔE (stain blocking average and total) measured as shown in Table 2 below.

TABLE 2

Stain Blocking ΔE

| | Composition Stain Blocking ΔE | | | | |
|---|---|---|---|---|---|
| | Shellac (Lab) | Inventive Polymer A | Inventive Polymer B | Inventive Polymer C | Inventive Polymer E |
| Permanent Marker | 0.24 | 0.39 | 0.54 | 0.24 | 0.39 |
| Red Crayon | 0.1 | 0.27 | 0.18 | 0.11 | 0.18 |
| Pencil | 0.11 | 0.41 | 0.06 | 0.08 | 0.16 |
| Black Dry Erase Marker | 0.11 | 0.27 | 0.05 | 0.05 | 0.26 |
| Green Dry Erase Marker | 0.09 | 0.28 | 0.1 | 0.16 | 0.17 |
| Stain Block avg | 0.13 | 0.32 | 0.19 | 0.13 | 0.23 |
| Stain Block Total | 0.65 | 1.62 | 0.93 | 0.64 | 1.16 |

Example 3

Water dispersible stain blocking coating compositions were prepared using the polymers of Table 3 below and as follows: solid (100%) rosin ester polymer (from the rosin acid, multi-functioned expoxide, and monofunctional expoxide reactants as described in Example 1) was melted in oven at 130° C. Next, an amine, calculated to neutralize 50% of the acid functionality of the wood rosin ester was dissolved in water, and the amine/water mixture was heated to 80° C. on a hotplate in a metal beaker fitted with Cowe Blade. The stirrer speed was adjusted to vigorous stirring of the amine solution while pouring the rosin ester melt rapidly into the beaker. Stirring was continued until sample was cooled to ambient temperature. The various conditions are set forth in Table 3 below.

TABLE 3a

Stain Blocking Polymer/additive

| Polymer | Rosin Acid (%) | Multi-functional Soybean Oil (%) | Monofuctional Soybean Fatty Acid (%) | Catalyst |
|---|---|---|---|---|
| 1 | 62 | 22 | 16 | PTSA |
| 2 | 62 | 22 | 16 | PTSA |
| 3 | 62 | 22 | 16 | MIM |
| 4 | 62 | 22 | 16 | MIM |
| 5 | 62 | 22 | 16 | IM |
| 6 | 62 | 22 | 16 | IM |

TABLE 3b

Stain Blocking Polymer/additive Properties

| Polymer | Mw | AV (Exp) | Tg (Exp) |
|---|---|---|---|
| 1 | 3088 | 96 | 5.92 |
| 2 | 3088 | 96 | 5.92 |
| 3 | 4954 | 99 | 13.8 |
| 4 | 4954 | 99 | 13.8 |
| 5 | 4367 | 101 | 13.3 |
| 6 | 4367 | 101 | 13.3 |

TABLE 4

Aqueous Dispersion
Amine Dispersions

| Dispersion | Polymer | Amine | NVM | Viscosity | % Acid Neutralization |
|---|---|---|---|---|---|
| A | 1 | DMEA | 24% | Thin dispn | 50 |
| B | 2 | DMEA | 35% | Coagulated | 50 |
| C | 3 | DMEA | 32% | Thin dispn | 50 |
| D | 4 | DMEA | 24% | Thin dispn | 50 |
| E | 5 | TEA | 35% | Coagulated | 50 |
| F | 6 | DMAMP | 35% | 123 cps | 50 |

Unless otherwise specified, all measurements herein are made at 23±1° C. and 50% relative humidity. The dimensions and values disclosed herein are not to be understood as being strictly limited to the exact numerical values recited. Instead, unless otherwise specified, such as dimension is intended to mean both the recited value and a functionally equivalent range surrounding that value. All ranges noted are intended to mean any endpoint within that range. For example, a dimension disclosed as "40 mm" is intended to mean "about 40 mm".

Illustrative embodiments have been described, hereinabove. It will be apparent to those skilled in the art that the above compositions and methods may incorporate changes and modifications without departing from the general scope of this disclosure. It is intended to include all such modifications and alterations within the scope of the present disclosure. Furthermore, to the extent that the term "includes" is used in either the detailed description or the claims, such term is intended to be inclusive in a manner similar to the term "comprising" as "comprising" is interpreted when employed as a transitional word in a claim.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein.

Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. An optionally neutralized acid-functional polyester polymer for providing a stain-blocking coating composition, the optionally neutralized acid-functional polyester polymer obtained from reactants including (i) an epoxidized ester of glycerol and a $C_{10}$ to $C_{30}$ fatty acid having multiple epoxide groups, (ii) an acid-functional terpenoid compound having two or more carboxylic acid functional groups, and (iii) a capping reactant;

wherein reactant (iii) is selected from an epoxidized ester of a $C_{10}$ to $C_{30}$ fatty acid having one epoxide group or an epoxidized ester of formula Va

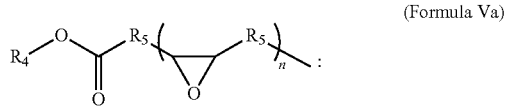

(Formula Va)

wherein $R_4$ is a $C_1$ to $C_4$ alkyl group, each $R_5$ is independently a $C_1$ to $C_{20}$ hydrocarbyl group, and n is an integer from 0 to 4 such that the epoxidized ester has up to 30 total carbons in the ester moiety and an average epoxide number of about 1 to about 3;

wherein reactants (i) and (ii) are polymerized, and then capped with reactant (iii); and wherein at least a portion of the acid-functional groups of the polyester polymer are optionally neutralized with a base.

2. The optionally neutralized acid-functional polyester polymer of claim 1, wherein the polyester polymer has a weight average molecular weight of about 1,000 to about 10,000.

3. The optionally neutralized acid-functional polyester polymer of claim 1, wherein the polyester polymer has an acid value of about 50 to about 150 mg KOH per gram.

4. The optionally neutralized acid-functional polyester polymer of claim 1, wherein the polyester polymer has a hydroxyl value of about 50 to about 300 mg KOH per gram.

5. The optionally neutralized acid-functional polyester polymer of claim 1, wherein the polyester polymer has a glass transition temperature of about −5° C. to about 50° C.

6. The optionally neutralized acid-functional polyester polymer of claim 1, wherein the acid-functional terpenoid compound is a bicyclic to a tetracyclic compound.

7. The optionally neutralized acid-functional polyester polymer of claim 1, wherein the acid-functional terpenoid compound is substituted with one or more $C_1$ to $C_{10}$ linear or branched alkyl groups.

8. The optionally neutralized acid-functional polyester polymer of claim 1, wherein the acid-functional terpenoid compound has an acid functionality of 3 or more.

9. The optionally neutralized acid-functional polyester polymer of claim 1, wherein at least a portion of the acid-functional groups of the polyester polymer are neutralized with a base to provide water dispersiblity thereto.

10. The neutralized acid-functional polyester polymer of claim 9, wherein the base is a tertiary amine.

11. The neutralized acid-functional polyester polymer of claim 9, wherein the base is selected from the group consisting of dimethylethanolamine, triethanolamine, triethyl amine, dimethylaminomethylpropanol, and combinations thereof.

12. The optionally neutralized acid-functional polyester polymer of claim 1, wherein the reactants are bio-sourced.

13. The optionally neutralized acid-functional polyester polymer of claim 1, wherein the reactants are provided in relative amounts of about 10 to about 30 weight percent of (i), about 50 to about 70 weight percent of (ii), and about 10 to about 25 weight percent of (iii).

14. The optionally neutralized acid-functional polyester polymer of claim 1, wherein a coating composition including the optionally neutralized acid-functional polyester polymer having a wet coating thickness of about 4 to about 7 mils, when dried as a film, exhibits stain-blocking as evidenced by a total ΔE of 2 or less.

15. A stain-blocking coating composition comprising:
at least one mineral extender, one or more pigments, a carrier solvent, and a stain-blocking additive including the optionally neutralized acid-functional polyester polymer according to claim 1.

16. The stain-blocking coating composition of claim 15, wherein the coating composition includes at least about 10 weight percent, based on total solids, of the stain-blocking additive.

17. The stain-blocking coating composition of claim 16, wherein the coating composition includes about 10 to about 30 weight percent, based on total solids, of the stain-blocking additive.

18. The stain-blocking coating composition of claim 15, wherein a weight ratio of the stain-blocking additive to the at least one mineral extender is about 1:1 to about 1:3.

19. The stain-blocking coating composition of claim 15, wherein the stain-blocking additive is bio-sourced and/or the stain-blocking composition is substantially free of shellac-based additives.

20. The stain-blocking coating composition of claim 15, wherein the optionally neutralized acid-functional polyester polymer is represented by Formula I having a weight average molecular weight of about 1,000 to about 10,000

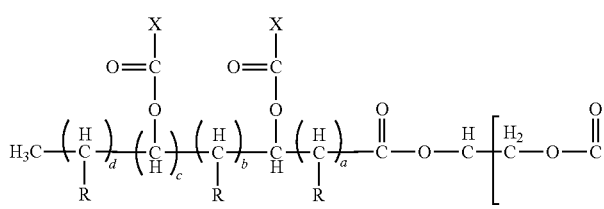 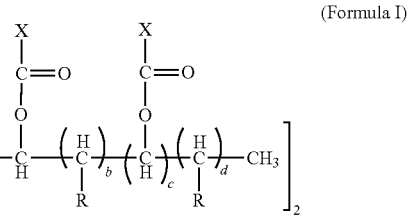

(Formula I)

wherein
- each R is independently hydrogen or a hydroxyl group;
- each a is independently an integer of 1 to 10, each b is independently an integer of 1 to 10, each C is independently an integer from 0 to 10, and each d is independently an integer of 0 to 10 such that a+b+c+d is a value from 10 to 30 sufficient to provide the weight average molecular weight of the polymer;
- each X is an acid-functional terpenoid compound of Formula II

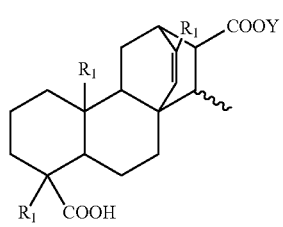

(Formula II)

wherein
- each $R_1$ is independently a $C_1$ to $C_4$ linear or branched alkyl group;
- ⁀⁀⁀ represents a covalent bond to the polymer of Formula I; and
- Y of Formula II is one of (i) a covalent bond to another polymer of Formula I or (ii) a residue of the capping reactant, provided that at least a portion of Y's present are residues of the capping reactant.

21. The stain-blocking coating composition of claim 15, wherein the reactants of the optionally neutralized acid-functional polyester polymer are provided in relative amounts of about 10 to about 30 weight percent of (i), about 50 to about 70 weight percent of (ii), and about 10 to about 25 weight percent of (iii).

22. The stain-blocking coating composition of claim 21, wherein reactant (iii) is an epoxidized methyl ester of a $C_{16}$ to $C_{20}$ fatty acid having one epoxide functional group or the epoxidized ester of Formula Va wherein $R_4$ is a methyl group.

23. The stain-blocking coating composition of claim 15, wherein the optionally neutralized acid-functional polyester polymer has an acid value of about 50 to about 150 mg KOH per gram, and/or wherein the optionally neutralized acid-functional polyester polymer has a hydroxyl value of about 50 to about 300 mg KOH per gram.

24. The stain-blocking coating composition of claim 15, wherein the composition includes no greater than about 5 grams of total VOC per 100 grams of polymer solids.

25. The stain-blocking coating composition of claim 24, wherein the composition is substantially free of VOCs.

26. The stain-blocking coating composition of claim 15, wherein at least a portion of acid-functional groups of the polyester polymer are neutralized with a base to provide water dispersiblity thereto.

27. The stain-blocking coating composition of claim 15, wherein the coating composition having a wet coating thickness of about 4 to about 7 mils, when dried as a film, exhibits stain-blocking as evidenced by a total ΔE of 2 or less.

28. The stain-blocking coating composition of claim 15, wherein the reactants of the optionally neutralized acid-functional polyester polymer are bio-sourced.

* * * * *